United States Patent [19]

Dropsy

[11] Patent Number: 5,019,914
[45] Date of Patent: May 28, 1991

[54] SYSTEM FOR RECORDING AND/OR TRANSMITTING BINARY INFORMATION AT A HIGH DATA RATE VIA KNOWN MEANS FOR RECORDING AND/OR TRANSMITTING VIDEO INFORMATION, AND FOR DECODING THE DIGITAL DATA

[76] Inventor: Patrick J. Dropsy, 12 bis, Bld Saint Asile, 83430-St. Mandrier, France

[21] Appl. No.: 273,968

[22] Filed: Nov. 21, 1988

[30] Foreign Application Priority Data

Nov. 25, 1987 [FR] France .................................. 8716325

[51] Int. Cl.⁵ .............................................. H04N 5/76
[52] U.S. Cl. ..................................... 358/310; 358/335; 358/12; 360/32; 360/33.1
[58] Field of Search ............... 358/142, 963, 316, 319, 358/330, 335, 141, 14, 15, 16, 310, 335; 360/32, 18, 29, 8, 9.1, 33.1, 15; 376/110, 4, 12; 375/52; 455/45

[56] References Cited

U.S. PATENT DOCUMENTS

Re. 31,863  4/1985  Saylor et al. ......................... 358/141
4,138,694   2/1979  Doi et al. ............................. 358/339
4,380,047   4/1983  Eisentiard et al. .................... 360/15
4,530,048   7/1985  Proper ................................ 360/15 X
4,575,773   3/1986  Dymond et al. ...................... 360/32
4,752,833   6/1988  Wolber ............................... 358/330
4,812,920   3/1989  Nagashima et al. ................. 358/310
4,819,059   4/1989  Pape .................................. 358/310

Primary Examiner—Robert L. Richardson
Attorney, Agent, or Firm—Oliff & Berridge

[57] ABSTRACT

A method and an apparatus encode and decode binary signals representative of digital information onto or from a high frequency carrier wave. The carrier wave replaces the chrominance signal of a composite video signal. Encoding and decoding of the binary signals are by phase modulation and demodulation of the carrier wave. The method and apparatus allow simultaneous transmission of both the binary signals and the monochrome portion of the composite video signal. The apparatus can be configured to serve as an interface between a mini-computer and a composite video recorder, so that the composite video recorder can be used as a mass storage peripheral.

15 Claims, 5 Drawing Sheets

SYSTEM FOR RECORDING AND/OR TRANSMITTING BINARY INFORMATION AT A HIGH DATA RATE VIA KNOWN MEANS FOR RECORDING AND/OR TRANSMITTING VIDEO INFORMATION, AND FOR DECODING THE DIGITAL DATA

The object of the invention is to provide methods and means for recording and/or transmitting and for decoding binary signals supplied at data rates of up to 1 Mbytes/sec, using known means for recording and/or transmitting composite video information and the methods and means for decoding the digital information.

The invention applies to the field of search relating to the recording and the transmission of binary-coded digital information.

There are several cases of industrial installations wherein binary signals are conveyed at a high data rate, in series over a single line (bus) or in parallel over several lines.

In many practical applications, these signals frequently appear together with video information supplied by a television camera or an image analyzing computer.

An object of the invention is to provide means for recording said binary signals produced at a high data rate or for transmitting same using the video recorders and/or the means of transmission used to record and/or transmit video information via the PAL system or the NTSC system.

In cases where the binary signals and the video information are transmitted concurrently, a further object of the invention is to provide means for simultaneously recording the luminance video information and the binary signals on the same recording medium, and/or transmitting same simultaneously via the same channel, in order to preserve the time relationship between the video images and the digital values measured simultaneously.

A non-limiting sample application of the invention would be that of a central processing unit linked via a single-line bus or via a bus made up of several parallel lines to several devices, each one including a sensor which sends on the bus binary-coded digital information at a very high data rate, on the order of 1 Mbytes/sec.

For instance, the central processing unit may be a central control unit in a manufacturing process (distilling apparatus, rolling mill, nuclear reactor, etc.) connected to various types of sensors (measuring temperature, pressure, level, etc.), or to servomotors controlled by a local microprocessor. It is useful to record all the binary signals that flow through the bus during a set period of time either to analyze said information in case of malfunction, or to check the operations of the facility, or to keep a full record of an actual testing period in order to subsequently analyze in greater detail the changes in the various parameters of the installation throughout said testing period.

The invention provides the means for recording 2.5 $10^9$ bytes per hour of operation at a data rate on the order of 0.7 Mbytes/sec.

The industrial installation may also include a TV camera that provides images of one of the elements in the installation. For instance, a locomotive robot may may be equipped with a TV camera that provides images from the area located in front of a robot and various acting elements that are connected to a central processing unit via a single line (bus) over which they receive streams of binary signals which control the engines of said acting elements. In such a case, the invention provides means for recording simultaneously on the same medium the black-and-white video information supplied by the camera and the binary signals conveyed by the bus, making it possible later on to restore and analyze the state of each acting element in relation to the position of the robot in space as evidenced by the TV image.

It will be recalled that the PAL TV system includes a luminance video signal and a chrominance video signal which is conveyed by a subcarrier with a typical phase modulated frequency of 4.43 MHz and a transmission band of 1 MHz. This 1-MHz transmission band enables to use this subcarrier to convey and/or record binary signals with a data rate of up to 1 Mbytes/sec.

The magnetic tapes used in PAL system industrial video recorders, such as the "U-MATIC" brand video recorders sold by the SONY Corporation, are 60-minute cassettes, thus providing for the recording of 2.5 Gbytes at a data rate of 0.7 Mbytes/sec.

In accordance with the invention there is provided a method whereby one associates a PAL or NTSC system composite video recorder with an electronic device which enables to phase modulate a subcarrier with a frequency of 4.43 MHz using the binary signals to be recorded instead of a chrominance video signal, and then to record this modulated carrier on said PAL or NTSC system composite video recorder, in the way one would record the chrominance video signal.

In accordance with the invention there is provided a means whereby one records six bytes per line while preserving approximately 600 lines per image, which enables the recording of about 700,000 bytes/sec.

The objectives of the invention are reached by a method for recording and/or transmitting binary signals at a high data rate using known means for recording and/or transmitting composite video signals; said method involves the following operations:
  a carrier with the same frequency as a carrier conveying analog chrominance video signals is generated;
  said carrier is phase modulated 0° or 180° by said binary signals using a phase modulator;
  the modulated carrier is mixed with video sync pulses and with phase reference bursts; the resulting signals can be recorded on a PAL or NTSC video recorder and/or transmitted.

In accordance with the invention there is provided a method to read digital information from a composite video recorder, an antenna or a video cable, as a phase modulated video carrier mixed with sync pulses and with phase reference bursts; said method involves the following operations:
  said phase modulated carrier is isolated using a bandpass filter;
  pulses enveloping said phase reference bursts are generated by means of a pulse separator circuit;
  said phase modulated carrier together with said phase reference burst envelope pulses are supplied to two input terminals of a circuit emitting a continuous reference signal in phase with said phase reference bursts and which lets said phase modulated carrier through;
  said reference signal is supplied to one input terminal of a phase demodulator circuit and said phase modulated carrier is supplied to another input terminal of said phase demodulator circuit;

and pulses reproducing the binary signals representative of said digital information are recovered at the output terminal of said phase demodulator circuit.

A method according to the invention is used advantageously to record and/or transmit, via known means for recording and/or transmitting composite video signals, both a high output of binary signals representative of digital information and black and white images taken concurrently with the digital information.

In this case, a method according to the invention involves the following operations:

the composite video signal is filtered by means of a trap filter which blocks the carrier modulated by the chrominance video signals with a frequency of 4.43 MHz and which lets the luminance video signals and the synch pulses through;

a carrier with a frequency of 4.43 MHz is generated;

a phase modulator is used to phase modulate said carrier 0° or 180° with said binary signals;

finally, the luminance video signal, the synch pulses, said phase modulated 4.43 MHz carrier and the phase reference bursts are mixed, thus yielding video signals which can be recorded on a composite video recorder and/or transmitted via a composite video channel, supplying black and white images together with digital information.

Certain numbers of lines at both ends of each video frame are advantageously specified not to contain any digital information so as to prevent video recorder read head switching interference liable to induce errors in the digital information transmitted and/or read after it has been recorded.

In accordance with a characteristic of the invention, a reference front is created at the start of each line containing digital information; said reference front precedes the first binary signal by a set duration and is transmitted and/or recorded as a binary signal.

Means in accordance with the invention, for recording and/or transmitting digital information via known video means, comprises a quartz-stabilized oscillator which generates a wave with the same frequency as that of the chrominance carrier and a phase modulator which receives said carrier wave at one of its input terminals, further receives said binary signals at its command terminal and which supplies, at its output terminal, said carrier wave unshifted while said binary signal is at 0, and phase shifted 180° while said binary signal is at 1, a video synch pulse generator and a mixer which receives said video synch pulses and said phase modulated carrier wave and which mixes them.

Means in accordance with the invention, for reading digital information supplied by a video recorder, an antenna or a video cable in the form of a carrier wave phase modulated by binary signals and mixed with synch pulses and phase reference bursts, comprises a bandpass filter tuned to the frequency of said carrier wave, which lets the latter and said phase reference bursts through; a synch extractor associated to a synch separator, which at one output terminal generates envelope pulses of said reference bursts; a reference generator with two input terminals, one connected to the output terminal of said filter and the other to said output terminal of said synch separator and which includes two output terminals, a first one supplying a reference wave in phase with said phase reference bursts and a second one supplying said phase modulated wave; and a phase demodulator whose modulated wave input terminal is connected to said second output terminal and whose output terminal supplies pulses which constitute said binary signals.

As a result, the invention provides for the analog recording of very large amounts of digital information onto video recorder tapes, using commercially available tapes and video recorders.

The invention also provides for the analog transmission of large amounts of digital information, on the order of 700 Kbytes/sec, using existing means for video transmission.

A specific advantage of the method and means in accordance with the invention resides in the fact that they enable the concurrent recording or transmission of the video signals representative of a black and white picture and of the digital information measured during the video picture taking process, thus making it possible to preserve the time relationship between the picture and the measurements, a highly valuable feature in connection with measurement interpretation.

The modulation and demodulation means in accordance with the invention enable to place digital information onto a video carrier wave using known phase modulators, such as ring-type frequency mixers which are generally used to obtain a beat frequency or as modulators of a frequency by another frequency.

The following description refers to the accompanying drawings which represent, in no way exhaustively, sample embodiments of the means in accordance with the invention.

Figure 1:
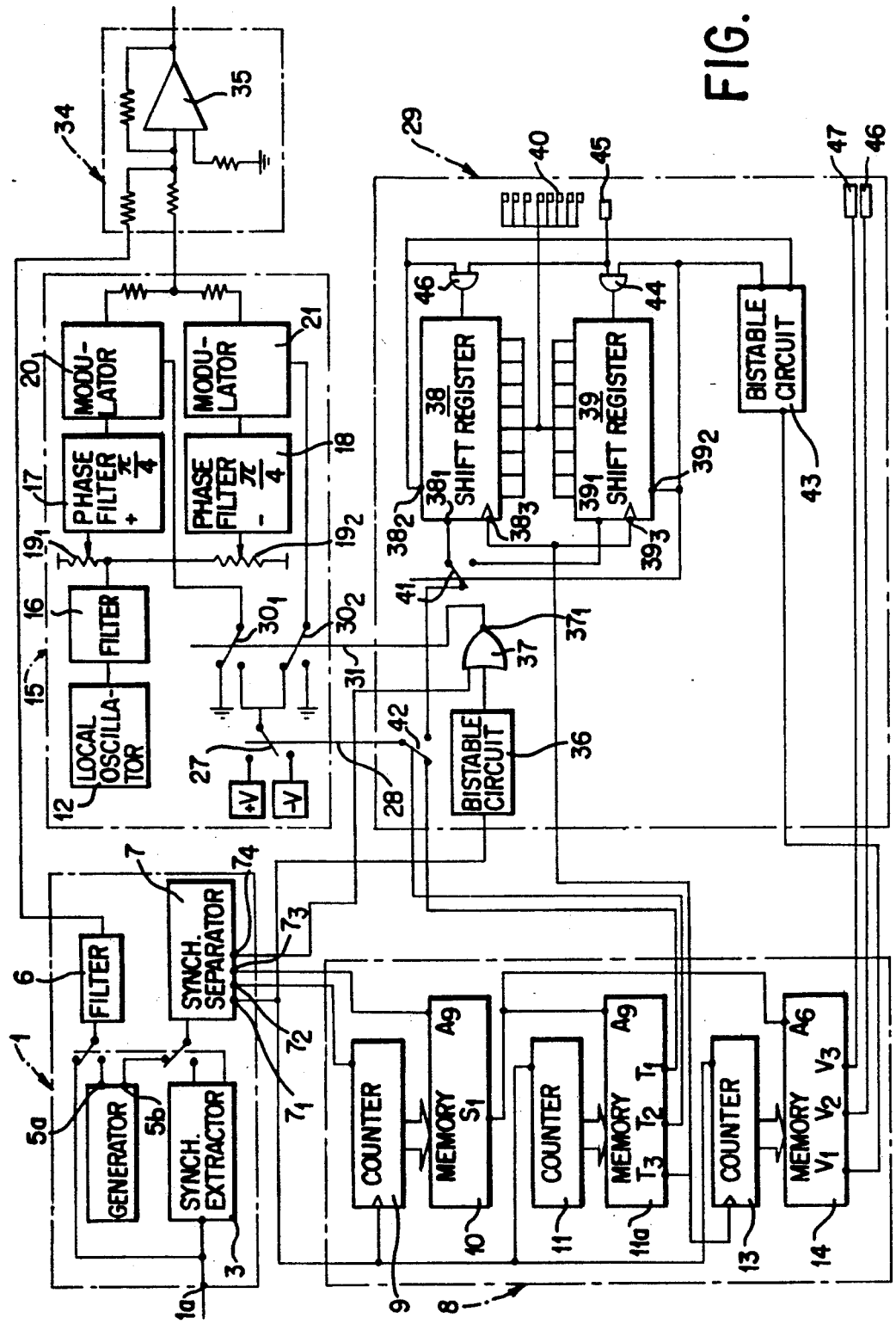
FIG. 1 is a block diagram showing the main circuits and components of a means in accordance with the invention designed to place digital information onto a video carrier wave, in order to record and/or transmit digital values using known video means.

FIG. 1 is a block diagram showing the modulation components and circuits making it possible to obtain a carrier wave corresponding to that of the chrominance carrier wave, mixed with video synch pulses, called field or picture synch and line synch and to phase modulate this carrier wave with binary signals representative of digital information; said carrier wave can be recorded on a PAL or NTSC system video recorder or can be transmitted over any existing video means (radio link or cable).

FIG. 1 shows block 1 which receives, possible at input terminal 1a, video signals supplied by a video camera or an image analyzing computer.

These video signals include synch pulses (image synch and line synch), a luminance video signal which produces black and white images, and possibly a chrominance video signal conveyed by a phase modulated carrier wave with a typical frequency of 4.43 MHz.

The video signals are fed to synch extractor 3 which controls two-stage switch 4a, 4b. Synch extractor 3 detects the presence or absence of a video signal at input terminal 1a and sends a logic signal which activates switch 4a, 4b.

Block 1 comprises generator 5 which generates a uniform luminance video signal (output terminal 5a) and video synch pulses (output terminal 5b).

First stage 4a of the switch comprises two input terminals, one connected to input terminal 1a and the other connected to output terminal 5a.

The output terminal of first stage 4a is connected to filter 6 which is a trap circuit tuned to a frequency of 4.43 MHz. This circuit eliminates the chrominance signal contained in the video signal received at input terminal 1a. It lets through only the luminance video signal and the synch pulses.

Block 1 comprises synch pulse regenerator and separator 7.

Second stage 4b of the switch comprises two input terminals, one connected to output terminal 5b and the other to the output terminal of synch extractor 3.

The purpose of synch extractor 3 is to isolate synch pulses and translate them into TTL signals.

For instance, the amplitude of CCIR standard synchs is 300 mv, and extractor 3 supplies logic signals at 0–5 volts compatible with TTL circuits.

Synch regenerator and separator 7 has 4 output terminals, $7_1$, $7_2$, $7_3$, and $7_4$, respectively.

Output $7_1$ supplies pulses representative of line synchs.

Output $7_2$ supplies pulses representative of frame synchs.

Output $7_3$ supplies a signal at logic level 0 in the case of an even ranked frame, and at logic level 1 in the case of an odd-ranked frame.

Output $7_4$ supplies a so-called reference burst envelope which is positionied at a given instant after each line synch and with a given duration.

Briefly, video signals are comprised of two half-images or frames called even (312 lines) and odd (313 lines) for a 625-line system. The lines of the two frames are interleaved. Each frame starts with a pulse called frame synch and each line starts with a line synch. Each line lasts 64 us and there are 25 images/sec.

The video images are generated in the form of a luminance signal which is represented by the amplitude of the video signal and by a chrominance signal which, in the PAL and NTSC systems the present invention relates to, phase modulates a subcarrier with a typical frequency of 4.43 MHz.

At the start of each line, immediately after each line synch, the chrominance signal comprises a few alternations of the non dephased carrier wave used as zero phase reference. These alternations are called reference bursts.

Means in accordance with the invention use a carrier wave with a frequency of 4.43 MHz to convey digital information in binary form which phase modulate this carrier by all or nothing, binary level zero corresponding to a nul phase shift and binary level 1 corresponding to a phase shift of 180°.

At the start of each frame, the carrier wave is subject to interference, and one should avoid using the perturbed areas since they might induce errors in the digital information. Accordingly, one should select in each frame the lines which can be used to convey the digital information without risk of errors.

Another difficulty resides in the arrangement of digital information on the lines; such arrangement must promote error-free information decoding in the read module.

The digital information cannot be positioned on all the lines of the even and odd frames.

Indeed, when the video signals are recorded on a video recorder tape, the tape is read along oblique lines by means of several alternatively-connected magnetic heads.

Head switching induces interference and a phase instability which may last up to 15 or even 25 lines depending on the quality of the video recorder. Such instability is caused by the time required to adjust to the zero phase reference provided by the reference burst. It is also dependent on the quality of the video recorder, and on the relationship between the speed of the read heads and that of the magnetic tape.

Read head switching occurs approximately 1 to 6 lines before each frame synch.

In addition, it is very important to position the digital information at precisely determined locations of each line in order to be able to decode them accurately on the read module.

In accordance with the present invention, only 5 or 6 bytes are positioned in series on each video line, plus 5 end-line control bits.

The problem to be solved is determining with accuracy the starting point of the digital information on each line.

One might consider positioning said starting point at a given distance from the preceding line synch, but this solution is not satisfactory.

Indeed, interference may alter the line and frame synchs.

In accordance with the invention, the digital information is positioned on each line with respect to particular signal called reference front, which is generated by the modulation circuits and which trails the digital information, i.e. it is recorded or transmitted concurrently with said digital information, which it immediately precedes on each line, in such way that it is identified by the reading and demodulation circuits.

In accordance with the invention, a reference front is created on each line, in the form of a phase change from 0° to 180° used as a precise origin for the digital information. Said phase change is of a given duration and the digital information start immediately thereafter.

Said reference front is located at a given distance from each line synch, for instance 8 alternations of the 4.43 MHz signal.

After having explained the problem raised by the positioning of the digital information on certain lines, let's turn again to the circuits of FIG. 1 which shows the means for obtaining said precise positioning.

FIG. 1 shows block 8 which contains several counters associated with memories designed to generate signals which are used to control the recording of the digital information onto the 4.43 MHz subcarrier.

Block 8 contains a first pulse counter 9, whose clock input is connected to output 7, of regenerator 7. Counter 9 is a 9-stage counter capable of counting up to $2^9 = 512$, which receives and counts the line synchs. The nine stages of the counter are connected to nine stages A0 through A8 of memory 10 with a capacity of 1 kilobits (1024 address steps).

This unit comprised of counter 9 and memory 10 is designed to select the video lines used to convey the binary signals.

The reset terminal of counter 9 is connected to output $7_2$ and receives the frame synchs.

Counter 9 can count up to 512. It is reset by each frame synch after counting, alternatively, 312, then 313, then 312, and so on.

Counter 9 is used as an address counter for memory 10. The last stage A9 of memory 10 is connected to output $7_3$ and thus alternatively receives binary signal 0 for the even frames and binary signal 1 for the odd frames.

As explained earlier, the first and last series of lines in each frame are deemed unsuitable for conveying digital information. For example, one intends to avoid using the first sixteen lines 0 through 15 of each odd and even frame, the last seven lines 306 through 312 of each even frame and the last seven lines 307 through 313 of each odd frame.

The memory is programmed to this effect, i.e. all the bits corresponding to addresses 0 through 15 and 306 through 312, as well as 512 through 527 and 819 through 821 are set at 1, while all the other bits corresponding to the lines to be used are set at 0.

Output S1 of the memory is connected to the highest order input terminal of two other memories, which are described hereinbelow.

Block 8 comprises a second counter 11, identical to counter 9, which is associated to a second memory 11a, identical to memory 10, which the latter uses as an address counter.

The clock input of counter 11 is connected to electronic clock 12 stabilized by a quartz whose frequency is 4.43 MHz. The reset terminal of counter 11 is connected to output $7_1$ and thus receives the line synchs.

The unit comprised of counter 11 and memory 11a is designed to generate the bit shift signals in the parallel/series shift registers to trigger the phase modulation. The purpose of said unit is also to supply the reference fronts which are added at the start of each series information in to accurately position this starting point.

The highest order bit A9 of memory 11a is connected to output S1 of memory 10, which is set at either 0 or 1. If output S1 is set at 0, the information can be output from the second memory 12. If output S1 is set at 1, memory 12 is inhibited and no information is output.

The period of the 4.43 MHz wave lasts 0.225 us. A video line lasts 64 us, from which 4 us must be subtracted for the line synch. Accordingly, there are 60 us left during which 226 alternations of the 4.43 MHz occur.

Counter 11 can count up to 512, but it is reset for each line synch when it reaches 226.

Memory 11a comprises three outputs identified as T1, T2, and T3.

Output T1 defines the position of the reference front on each line, output T2 supplies a square pulse called reference front envelope which frames the reference front and which is used to channel successively the reference front then the binary signals representative of the digital information toward the phase modulator.

Output T3 supplies strobe pulses lasting four 4.43 MHz alternations, i.e. 900 us, which are used as a clock pulses controlling the shift registers.

Output T3 is connected to the clock input of a third pulse counter 13, identical to counters 9 and 11. The reset terminal of counter 13 is connected to output $7_1$ and receives the line synchs. Counter 13 is associated to a third memory 14 and is used by the latter as an address counter.

The highest order input A6 of this memory is connected to output S1 of the first memory 10. Memory 14 has three channels V1, V2, and V3.

The unit comprised of counter 13 and memory 14 is designed to supply shift register switch pulses and to generate shift register byte ready request pulses.

Counter 13 counts the pulses supplied by output T3 of the second memory. Since each line contains six bytes conveying digital information plus four control bits, i.e. a total of 52 bits, counter 13 counts from 0 to 52, and is then reset by the next line synch.

Output V1 supplies an impulse at the beginning of each byte and at the beginning of the control half-byte. Output V2 supplies shift register byte feed request pulses.

Output V3 supplies a shift register control half-byte feed request pulse.

FIG. 1 shows block 15 which comprises the circuits and components enabling to phase modulate a wave with a frequency of 4.43 MHz by all or nothing with binary-coded digital information.

Block 15 comprises electronic clock 12 which is an oscillator stabilized by a quartz with a natural frequency of 4.43 MHz.

Oscillator 12 has a TTL output which is connected, as stated previously, to the input of counter 11. Said output is also connected to narrow passband filter 16 which only lets through the 4.43 MHz sinusoidal fundamental frequency.

The output of filter 16 is connected in parallel to two static phase shifters 17 and 18 which phase shift the oscillating voltage by respectively $+45°$ and $-45°$ to obtain two sinusoidal voltages phase shifted by $90°$.

The filter output is connected to each static phase shifter by means of potentiometer $19_1$ or $19_2$ enabling to adjust the amplitude of the carrier wave to 4.43 MHz.

It is easier to realize two $\pm 45°$ phase shifts than a single $90°$ phase shift because the phase stability superior. Nevertheless, the two phase shifters 17 and 18 could be replaced by a single $90°$ phase shifter located on one of the two channels.

Said $90°$ phase shifter is required to provide compatibility with the PAL system, wherein the reference bursts are phase shifted by $90°$ from one line to the next to help eliminate phase drift.

Block 15 comprises two identical circuits 20 and 21 which are modulator circuits, wherein the 4.43 MHz carrier wave is phase modulated with the binary signals which are representative of the digital information.

Figure 2:
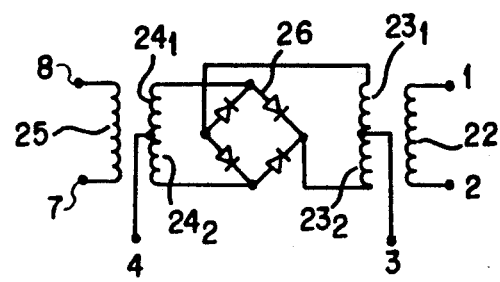
FIG. 2 is a diagram showing a frequency mixer or ring-type phase modulator.

FIG. 2 is a larger-scale schematic representation of a non limiting embodiment of one of the circuits 20 or 21; it should be stressed that said circuits can be made up of any known phase modulator.

Each circuit 20 or 21 is a circuit known as a frequency mixer or as a ring type modulator or demodulator, or as a double-balanced mixer (DBM), which can be used to mix two frequencies called local oscillation (L.O.) and radio frequency (R.F.) to obtain a beat frequency called intermediate frequency (I.F.). Said circuits are sold for instance by Scientific Components Corp. in the SRA series. They comprise a primary winding 22, with terminals 1 and 2 between which a first voltage, for example the local frequency (L.O.), is applied. Primary winding 1 is coupled by induction with a first series of two secondary half-windings $23_1$ and $23_2$, with a middle point connected to terminal 4.

The two half-windings $24_1$ and $24_2$ are coupled by induction to output winding 25 with two terminals 7 and 8 in between which a second voltage called radio frequency (R.F.) is applied. It comprises diode bridge 26 whose two ends along one diagonal are connected to the external ends of the first two secondary half-windings $23_1$, $23_2$ and whose two ends along the other diagonal are connected to the two external ends of the two secondary half-windings $24_1$, $24_2$.

The intermediate voltage or beat voltage is recovered between terminals 3 and 4.

Said circuit is reversible. These circuits can be used to detect a phase difference between the same-frequency voltages applied respectively between terminals 1 and 2 and terminals 7 and 8 and, in this case, a direct current proportional to the phase difference is recovered between terminals 3 and 4. Such application is also reversible. The present invention takes advantage of this second property of ring type mixers.

If a sinusoidal voltage is applied between two end terminals for example 1 and 2, and strobe pulses are applied between terminals 3 and 4, this produces between terminals 7 and 8 a sinusoidal voltage with the same frequency as that of the voltage applied between terminals 1 and 2 which will not be phase shifted when the strobe voltage is at level 0 and which will exhibit a given phase shift, for example 180°, when the strobe voltage is at level 1.

Conversely, if a sinusoidal alternating voltage is applied to terminals 1 and 2, and a voltage with the same frequency, alternatively phase shifted 180° and unshifted, is applied to terminals 7 and 8, this produces a strobe voltage, i.e. pulses, between terminals 3 and 4.

Accordingly, circuits 20 and 21 can be used to phase modulate a sinusoidal voltage applied between terminals 1 and 2 or 7 and 8, with a series of pulses representative of binary digits applied in series between terminals 3 and 4, and it is said application which is used in block 15 of FIG. 1.

Identical mixing circuits can also be used to demodulate a phase modulated voltage; it is this second application which is used in the demodulating circuits to be described hereinbelow.

Turning back to FIGS. 1 and 2, the 4.43 MHz voltage supplied by static phase shifter 17 is applied between input terminals 1 and 2 of mixing circuit 20, and the 4.43 MHz voltage supplied by static phase shifter 18 is applied between terminals 1 and 2 of mixing circuit 21.

FIG. 1 shows two voltage sources $+V$ and $-V$, for example $+200$ mV and $-200$ mV, which are representative of level 1 and level 0 of the pulses conveying the digital information. These two sources are connected to the two terminals of switch 27, which is controlled by the pulses representative of the digital information which are supplied in series by line 28 originating from another block 29 to be described subsequently.

The common output of switch 27 is connected in parallel respectively to an input terminal of a first switch $30_1$, whose second input terminal is grounded, and to an input terminal of a second switch $30_2$, whose second input terminal is grounded. These two switches $30_1$ and $30_2$ are controlled simultaneously by pulses supplied by line 31, which originates from block 29, and which permit the introduction of phase reference bursts in the signals. The two switches $30_1$ and $30_2$ are drawn in the position wherein the line is at potential 0 and in this case, it is switch $30_2$ that is used.

The output terminals of the two switches $30_1$ and $30_2$ are connected respectively to terminals 3 and 4 of ring type mixer 20 and to terminals 3 and 4 of ring type mixer 21.

Output terminals 7 and 8 of mixer 20 and of mixer 21 are connected in parallel through resistors $32_1$ and $32_2$ to line 33 originating from block 15.

FIG. 1 shows output block 34 which contains amplifier 35 used as analog summer of the phase modulated voltage which is supplied by line 33 and of the luminance video signal mixed with the frame and line synch pulses supplied by block 1.

Accordingly, block 34 supplies a frame and line synch mix of a luminance video signal producing a black and white picture, and a 4.43 MHz wave which is phase modulated by all or nothing with digital information.

This mix is analogous to the video signals typical of the PAL or NTSC systems. It can thus be recorded on any commercially-available video recorder compatible with such systems. It can also be transmitted via radio link or via cable using standard means for transmitting video signals and recorded on a video recorder while the black and white pictures can be displayed on a video screen.

FIG. 1 shows block 29 which contains logical circuits and shift registers.

Block 29 comprises pulse divider 36 (1:2) which is a bistable trigger circuit one input of which is connected to output $7_1$ of synch separator 7 and whose output $36_1$ supplies pulses of same duration as that of a line.

Output $36_1$ is connected to one input of AND gate 37 whose second input is connected to terminal $7_4$ which supplies the reference burst envelopes.

Accordingly, output $37_1$ of gate 37, which is connected to line 31, supplies one reference burst envelope every other line; said pulse simultaneously controls the two switches $30_1$ and $30_2$. During said reference burst envelope pulse, switch $30_1$ is closed and lets through the wave supplied by phase shifter 17 which is phase shifted 90° with respect to that supplied by phase shifter 18 and which constitutes the phase reference bursts of every other line.

At all other times, it is ring type phase shifter 21 which operates.

Block 29 comprises two shift registers 38 and 39 whose purpose is to set in series on one line the digital information supplied in parallel in the form of bytes by eight lines 40 which are connected in parallel to the respective parallel inputs of the two shift registers. The serial output terminals $38_1$ and $39_1$ of the two registers are connected to the two inputs of switch 41 which operates as a logic multiplexer.

The common terminal of switch 41 is connected to one input terminal of switch 42 whose second input terminal is connected to output T1 of memory 11a which determines the reference front.

The common terminal of switch 42 is controlled by the pulses supplied by output T2 of memory 11a which supplies a pulse that frames the reference front of supplied by output T1, so that switch 42 is in the configuration shown in FIG. 1 during the entire duration of said reference front envelope pulse and lets through the reference front toward modulator 21 which effects a phase shift found in the signal output by phase shifter 21 and mixer 35.

At the end of the reference front envelope pulse supplied by output T2, switch 42 flips and the pulse trains supplied in series alternatively by outputs $38_1$ and $39_1$ of one then the other of the two shift registers are sent via switch 27 to ring type phase shifter 21 which transforms them into phase modulations of the 4.43 MHz carrier wave.

Block 29 comprises a second pulse divider 43 (1:2) which is a bistable trigger circuit one input of which is connected to output V1 of memory 14, which supplies a pulse at the start of each byte or control half-byte.

The two oppositely-poled outputs Q and $\overline{Q}$ of the bistable circuit thus supply opposite direction pulses which alternate with each new byte or half-byte.

Output Q is connected to bit shift clock disable terminal $39_2$ of register 39 and controls switch 41. It is also connected to one input of AND gate 44 whose second input is connected to terminal 45 which loads the bytes in the registers.

The second output $\overline{Q}$ of bistable circuit 43 is connected to bit shift clock disable terminal $38_2$ of register 39 and to one input of a second AND gate 46, whose second input is also connected to byte load terminal 45.

Finally, output T3 of memory 11a is connected to clock inputs $38_3$ and $39_3$ of the two shift registers.

The system operates as follows.

The digital information is conveyed in parallel in the form of bytes by the eight lines 40. Said bytes must compulsorily be set in series on line 28 in order to control switch 27.

While one byte is loaded into one of the shift registers 38 or 39, the other register is dumped in series through output $38_1$ or $39_1$ via switch 41 which flips at the beginning of each byte, then via switch 42.

Each byte is made available to the parallel input of a register following a byte load pulse which originates from an external buffer memory and which is fed to input 45 then passes alternatively through gate 44 or gate 46, whose openings are alternatively controlled by outputs Q and $\overline{Q}$ of bistable circuit 43.

The register shift clock which controls the sequence of the serial pulses is constituted by output T3 of memory 11a. As stated hereinabove, the period of this clock is equal to four periods of the 4.43 MHz wave.

FIG. 1 shows that output V2 of memory 14, which sends byte load request pulses, is connected to terminal 46, and that output V3, which sends control half-byte load request pulses, is connected to terminal 47. Terminals 46 and 47 are connected to an external unit, for example a buffer memory, to cadence the byte and control half-byte transfer to input 40 of the shift registers.

When there is no byte present at parallel input 40, the shift clocks of registers 38 and 39 continue giving cadence and take into account the serial input of the registers, which is connected to the ground, whence phase modulation by zeros, i.e. no modulation of the 4.43 MHz carrier wave.

Figure 3:
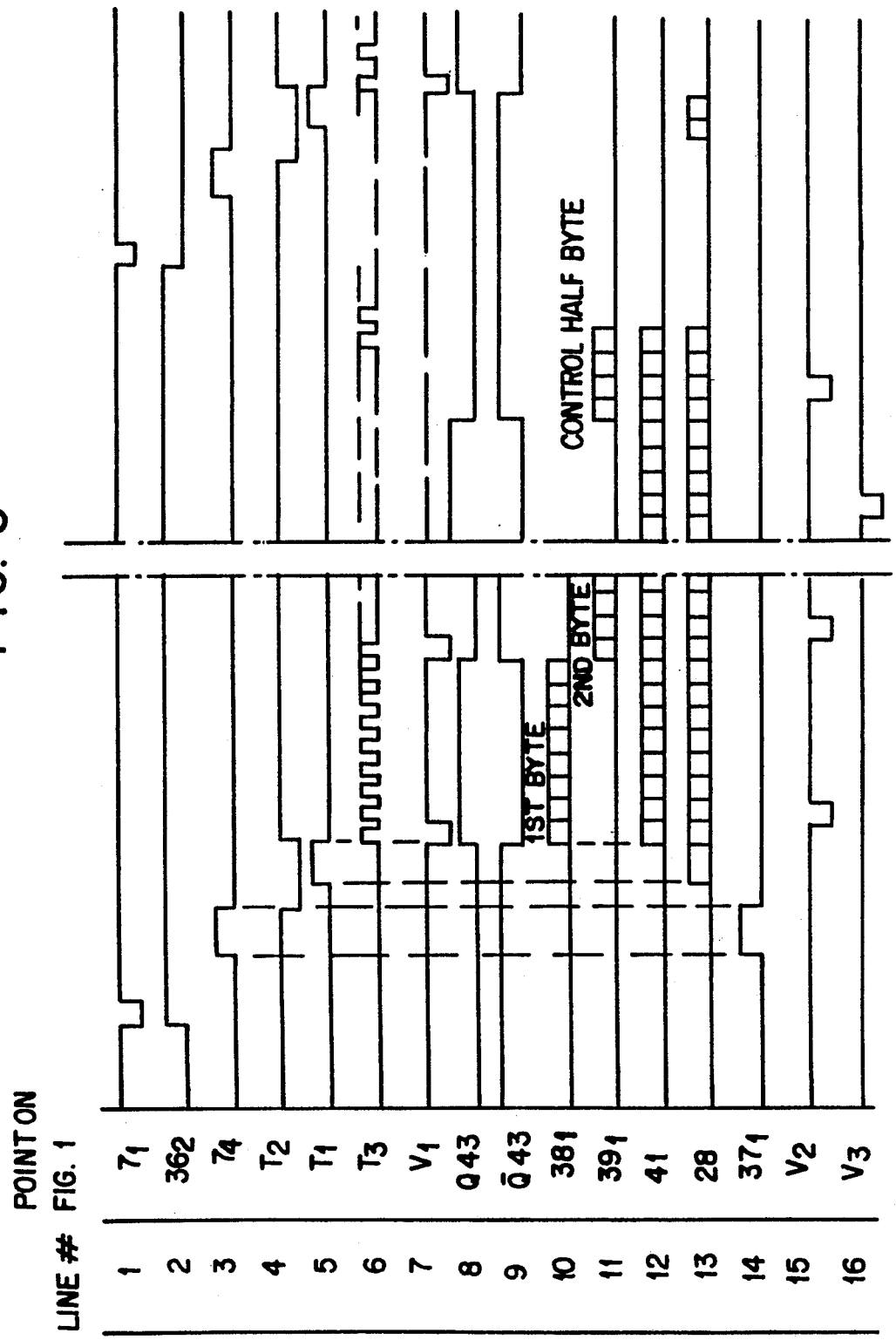
FIG. 3 is a timing diagram showing the pulses exhibited at various points of the circuits of FIG. 1 during the lines which are used to contain digital information.

FIG. 3 shows a diagram of the pulses present at various points of the circuits shown in FIG. 1. This diagram represents time along the x axis.

Line 1 is representative of the line synchs originating from terminal $7_1$.

Line 2 is representative of the pulses supplied by output $36_1$ of bistable circuit 36.

Line 3 is representative of the phase reference burst envelopes supplied by output $7_4$ of separator 7.

Line 4 is representative of the pulses supplied by output T2 of memory 11a which constitute the reference front envelopes.

Line 5 is representative of a rising front at output T1 of memory 11a, which constitutes the reference front for each line.

Line 6 is representative of the pulses supplied by output T3 of memory 11a which are used as clock pulses by counter 13 and by shift registers 38 and 39.

Line 7 is representative of the pulses supplied by output V1 of memory 14, which actuate bistable circuit 43 whose outputs control the loading of the bytes alternatively into one or the other of the two shift registers.

Line 8 is representative of the pulses supplied by output Q of bistable circuit 43.

Line 9 is representative of the pulses supplied by output $\overline{Q}$ of bistable circuit 43, which alternate with the preceding.

Line 10 is representative of the eight-pulse trains supplied in series by output $38_1$ of shift register 38.

Line 11 is representative of the eight-pulse trains supplied in series by burst $39_1$ of shift register 39, which alternate with the preceding.

Line 12 is representative of the sequence of eight-impulse trains in series (bytes) supplied by the common terminal of switch 41, which constitute the sum of the two preceding lines.

Line 13 is representative of the pulse trains supplied by the common terminal of switch 42 on line 28 which correspond to the preceding pulses plus the reference front (line 5).

Line 14 is representative of the pulses supplied by AND gate 37, i.e. every other phase reference burst envelope.

Line 15 is representative of the pulses supplied by output V2 of memory 14, i.e. the pulses requesting to load each byte into the shift registers.

Line 16 is representative of the pulses supplied by output V3 of memory 14, i.e. the pulses requesting to load the control half-bytes into the shift registers.

The pulses supplied by outputs V2 and V3 are sent to external buffer memories, wherein the digital value bytes and the control half-bytes are stored and these pulses control the transfer of the successive bytes to parallel input 40.

The section below summarizes the operations of an embodiment according to FIG. 1. Said embodiment is used to set binary pulses representative of digital values onto a video subcarrier by phase modulating said subcarrier by all or nothing, with the ensuing result that the digital values are conveyed by an analog signal which can be transmitted and/or recorded by well-known means for transmitting or recording analog video signals.

Block 15 contains the fundamental circuits. The subcarrier wave is generated by oscillator 12.

In the described preferred example, said carrier wave has a frequency of 4.43 MHz which corresponds to the usual frequency of the chrominance signal subcarrier, with the resulting advantage of being able to mix subsequently in block 34 said carrier wave with luminance signals and with synch pulses in order to simultaneously transmit and/or record a black and white picture and digital information. It is stressed that this preferred example is not limiting and another video carrier wave can be modulated with digital information in cases where the subcarrier frequency is different from 4.43 MHz. Since said carrier wave has a very high frequency, it can transmit digital information at a high data rate.

The digital information is fed to block 15 via line 28, and is sent to intermediate terminals 3 and 4 of phase modulator 21. The carrier wave is connected to one of the inputs of phase modulator 21, and the output of said modulator supplies a wave phase modulated by all or nothing with the digital information, i.e. unshifted when the modulator receives a binary signal at level 0 and phase shifted 180° when the modulator receives a binary signal at level 1. The duration of the binary pulses is a multiple of the period of the subcarrier wave; for example, the cycle of the binary pulses shown on line 6 of FIG. 3 is equal to four periods of the carrier wave.

The second ring type mixer 20 shown in FIG. 1 is an accessory component which is only used to let through during a few periods the 90° phase-shifted subcarrier wave in order to serve as phase reference in the PAL system.

Block 1 in FIG. 1 represents a sample embodiment making it possible to use either an external video output and to extract the synch pulses therefrom while keeping the luminance signals, or a video generator which generates synch pulses and a uniform luminance signal.

Block 8 corresponds to counters and memories used to generate the pulse frequency for the modulation operations.

The unit comprised of counter 9 and memory 10 determines which lines in each frame are to convey the digital information by eliminating a few lines at the beginning and at the end of the frame where the subcarrier wave might be subject to interference.

The unit comprised of counter 11 and memory 11a receives the subcarrier wave supplied by oscillator 12, which is used as clock signal, and it generates a rising front T1 represented on line 2 of the diagram, which is used as the time origin on each line for the accurate positioning of the digital information on this line. Its output T3 also supplies pulses whose duration is equal to four periods of the carrier wave, and whose purpose is to convey the digital information.

The unit comprised of counter 13 and memory 14 is controlled by pulses T3 and is used to supply on outputs V1, V2, and V3 the pulses represented respectively on lines 7, 15, and 16 of the diagram, which control the beginning of the serially available digital information bytes.

Block 29 mainly contains two shift registers which put in serial form the digital information received in parallel on eight lines, and make said digital information available at the desired time so they can be sent on the lines and on the line sections selected by the circuits of block 8.

Figure 4:
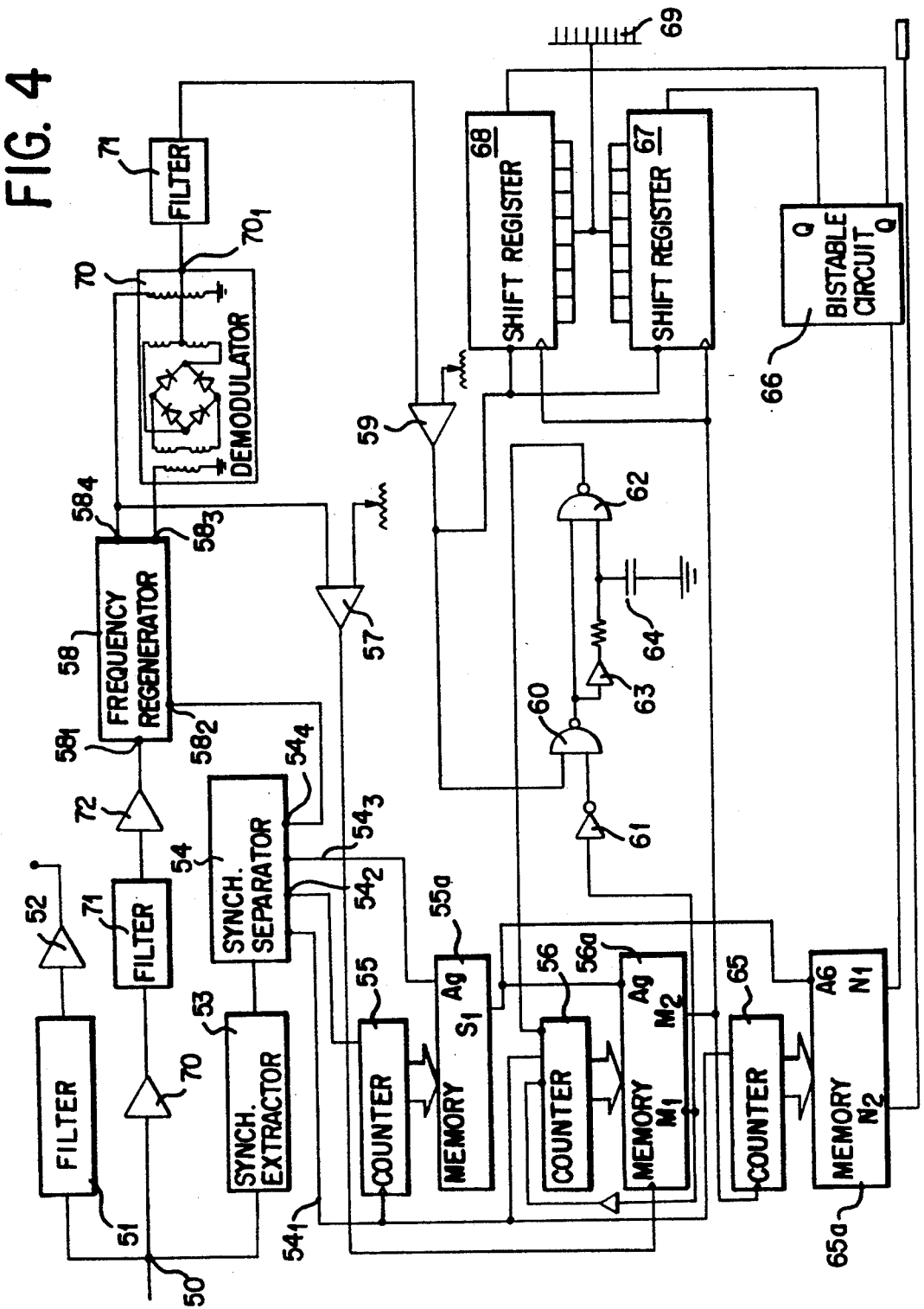
FIG. 4 is a block diagram showing the main circuits and components of a means in accordance with the invention designed to read the digital information contained by a video carrier wave supplied by a video recorder, a video antenna or a video cable.

FIG. 4 is a block diagram showing a preferred embodiment of the read circuits in accordance with the invention, i.e. of the circuits which are used to separate the digital information carrier wave from the other video signals recorded or transmitted as output of an apparatus according to FIG. 1, and which extract from the phase modulated wave the digital information it conveys.

The video signals supplied by a video recorder or a video link are fed to the apparatus via terminal 50, located in the upper left corner.

Said signals are sent in parallel to wave filter 51 which suppresses the signals with a frequency of 4.43 MHz.

The output of filter 51 is connected to amplifier 52 whose output is connected to a TV set or a monitor which reproduces any black and white picture contained by the received signals.

The received signals are also sent to composite synch extractor 53, then to synch pulse regeneration and separation apparatus 54 which comprises four outputs. Output $54_1$ supplies the line synchs. Output $54_2$ supplies the frame synchs. Output $54_3$ supplies a logic signal at level 0 for even frames and at level 1 for odd frames. Output $54_4$ supplies envelope pulses of the phase reference bursts. Circuits 53 and 54 are identical to circuits 3 and 7 shown in FIG. 1 and outputs $54_1$ through $54_4$ fill the same purpose as outputs $7_1$ through $7_4$.

The apparatus according to FIG. 4 includes a unit comprised of pulse counter 55 associated with memory 55a which fills the same purpose as unit 9/10 shown in FIG. 1. Memory 55a comprises output 51 which generates a signal at level 1 during the lines of each frame which are not used to convey digital information, and a signal at level 0 during the lines which are used to that purpose.

The apparatus according to FIG. 4 includes a second unit comprised of pulse counter 56 associated with memory 56a which are analogous to counter 11 associated with memory 11a, and which nearly fill the same purpose.

The clock input of counter 56 receives pulses at a frequency of 4.43 MHz, which are formatted to the TTL standard (0– 5 V) by amplifier comparator 57 connected to output $58_4$ of reference wave regenerator 58.

Memory 56a has two outputs.

Output M2 is programmed to deliver a clock signal for the next counter, which is also used as clock signal for the shift registers.

Output M1 of memory 56a is programmed to supply pulses intended to rephase the clock signals supplied by output M2 with the reference fronts mixed with the digital information.

The method involves the following operations.

Counter 56 is reset by each line synch and counts the 4.43 MHz frequency pulses. The reference front is extracted from the digital information and formatted to the TTL standard by comparator 59 whose output is connected to one input of NOT-AND gate 60. Output M1 of the memory is programmed to generate a pulse (window) between two given pulses of the 4.43 MHz wave, for instance between the 14th and 23rd pulses, values between which the reference front is located.

The pulse supplied by output M1 is inverted by reversing switch 61 and sent to the second input of NOT-AND gate 60, whose output generates a new pulse with a falling front which coincides with the beginning of the window and a rising front which coincides with the reference front. This pulse is sent directly to an input of a second NOT-AND gate 62. It is also sent through reversing switch 63 to RC type pulse delay unit 64 which delays the falling front and whose output is connected to the second input of NOT-AND gate 62, so that the output of gate 62 supplies a narrow pulse which coincides with the reference front. Output of gate 62 is connected to the load terminal of counter 56.

FIG. 4 shows that output M1 of memory 56a is looped to a stage of address counter 56, for example stage 6 corresponding to binary number 32, which is beyond the end of the window.

After receiving the load pulse supplied by gate 62, counter 56 thus starts counting addresses starting from 32, which coincides with the reference front.

We know that the first digital information bit starts for example after eight alternations of the 4.43 MHz clock, counted from the reference front, and lasts four alternations. Output M2, which supplies the sampling pulses of the shift registers, is programmed for example to supply the first signal 10 alternations after the reference front, and from that point on, it supplies a number of bits whose duration is equal to four alternations of the 4.43 MHz signal and whose number corresponds to the number of digital information bytes per line plus one control half byte, i.e. for example 52 bits for records including six bytes per line and one control half byte.

The apparatus shown in FIG. 4 comprises, in addition, a unit composed of a third binary counter 65 used as address counter by memory 65a, whose scope and purpose are identical to those of counter 13 associated to memory 14.

The clock pulses of counter 65 are the pulses supplied by output M2 of memory 56a.

Memory 65a has a first output N1 which supplies one pulse every eight clock pulses.

Output N1 is connected to an input of bistable circuit 66, which fills the same purpose as that of bistable circuit 43 shown in FIG. 1 and whose two outputs alternatively control the enabling and disabling of the shift clock of the two shift registers 67 and 68, which receive the digital information in series and which deliver them in parallel on eight output lines 69.

Output N2 of memory 65a supplies pulses for loading the digital information originating from the shift registers into the input interface of a computer which processes said information.

Input terminal 50 is connected via amplifier 70 to narrow-passband filter 71, tuned to 4.43 MHz, so that it only lets through the 4.43 MHz carrier wave phase modulated with the digital information and the phase reference bursts. The output of filter 71 is connected to amplifier limiter 72 whose output is connected to input $58_1$ of frequency regenerator 58, stabilized by a quartz with a natural frequency of 4.43 MHz.

A second input $58_2$ of regenerator 58 is connected to terminal $54_4$ of synch separator 54, which generates envelope pulses of the phase reference bursts.

Circuit 58 has two outputs $58_3$ and $58_4$. It operates as follows. While it receives an envelope pulse of a reference burst on input $58_2$, input $58_1$ receives said reference burst. At this point the circuit operates as an amplifier and supplies on its output $58_3$ a wave which is in phase with the phase reference wave. When the envelope pulse of the phase reference received on terminal $58_2$ stops, circuit 58 continues to operate as an oscillator and to supply to its output $58_3$ a 4.43 MHz reference wave whose phase shifts 90° at each line in the PAL system.

Output $58_4$ of circuit 58 does not supply any wave while pulses are received on terminal $58_2$, and it supplies the phase modulated signal received on input $58_1$ the rest of the time. Circuit 58 is a known circuit, for example an integrated circuit sold by RCA under reference CA-3128Q.

The apparatus according to FIG. 4 comprises phase demodulator 70 which should preferably be identical with the ring type mixer shown in FIG. 2 and with phase modulators 20 and 21 shown in FIG. 1.

Input terminals 1 and 2 of demodulator 70 are connected between the ground and terminal $58_3$ and thus receive a non modulated reference voltage.

Output terminals 7 and 8 of demodulator 70 are connected one to the ground and the other to terminal $58_4$ of circuit 58 and thus receive a voltage with a frequency of 4.43 MHz which is phase shifted 0° or 180° with respect to the reference voltage by digital information.

Terminal 3 of the modulator is connected to the ground and terminal 4 is connected to output terminal $70_1$ which supplies direct voltage pulses at level zero when the phase shift is zero, and at level 1 when the phase shift is 180°. Output terminal $70_1$ is connected to filter 71 which is used to suppress the residual harmonics of the voltage at 4.43 MHz. The output of filter 71 is connected to operational amplifier 59 set up as a comparator whose purpose is to format the pulses in accordance with the TTL standard (0–5 V).

The binary pulses supplied by comparator 59 are sent in parallel to the serial inputs of the two shift registers 67 and 68. Said pulses also include the reference front preceding on each line the digital information, and the output of comparator 59 is connected to an input of NOT-AND gate 60, as described hereinabove.

Figure 5:
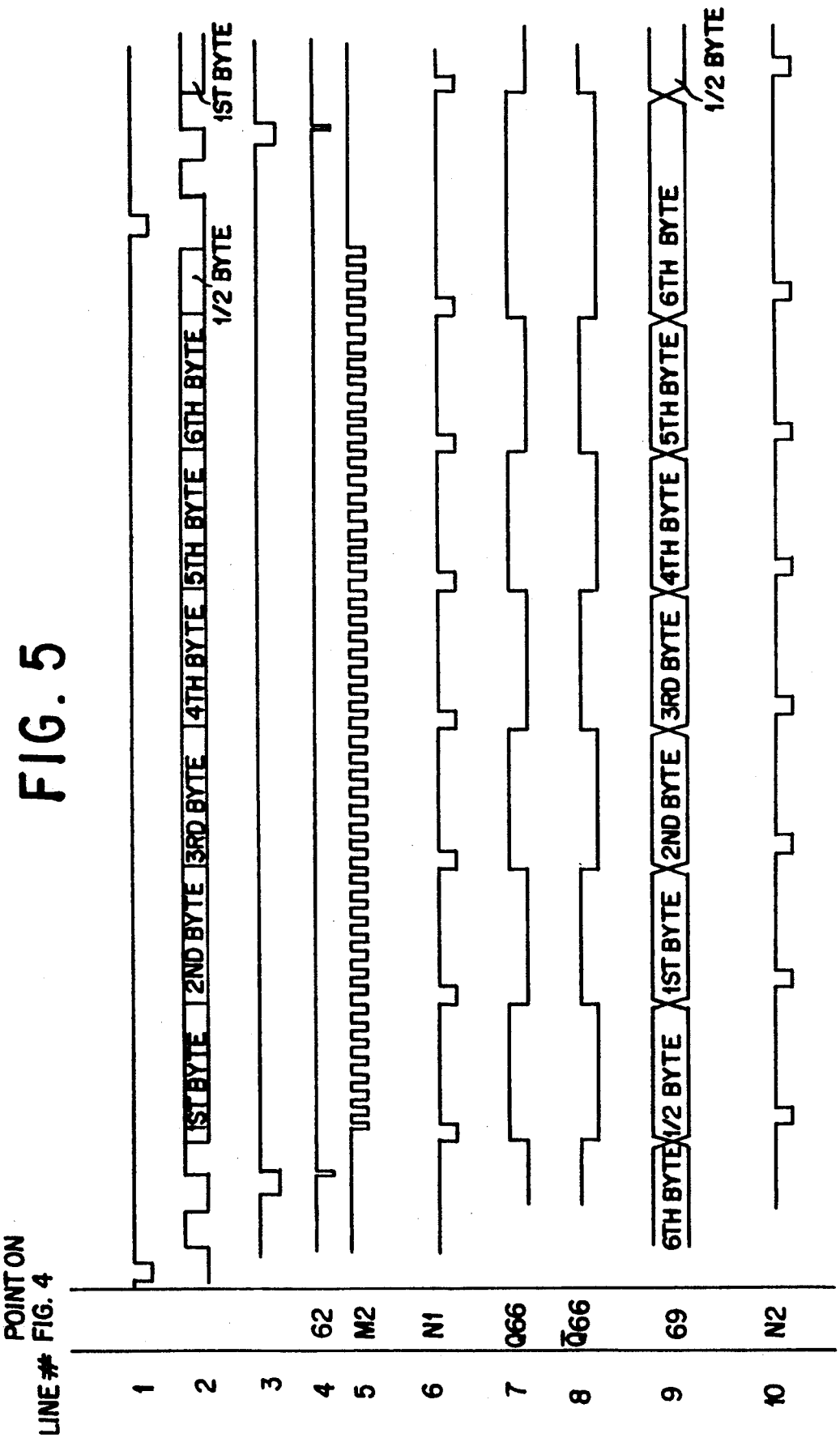
FIG. 5 is a timing diagram showing the pulses exhibited at various points of the circuits of FIG. 4 during the lines which are used to contain digital information.

FIG. 5 is a timing diagram showing time along the x axis, and which represents the pulses at various points of the circuits shown in FIG. 4, during the lines used to convey the digital information.

Line 1 is representative of the line synch pulses on output $54_1$.

Line 2 is representative, on a video line, of the locations of the envelope of the reference burst, of the reference front, of six digital information bytes and of a control half byte.

Line 3 represents with an arrow the rising front constitutive of the reference front.

Line 4 is representative of the very narrow pulses supplied by NOT-AND gate 62.

Line 5 is representative of the clock pulses of the shift registers supplied by output M2 of memory 56a.

Line 6 is representative of the pulses at the beginning of bytes supplied by output N1 of memory 65a.

Lines 7 and 8 are representative of the polarity pulses supplied respectively by outputs Q and $\overline{Q}$ of bistable circuit 66.

Line 9 is representative of the appearance of a byte or of a control half byte on parallel outputs 69.

Line 10 is representative of the pulses supplied by output N2 of memory 65a to control the transfer of the bytes to a computer.

Figure 6:
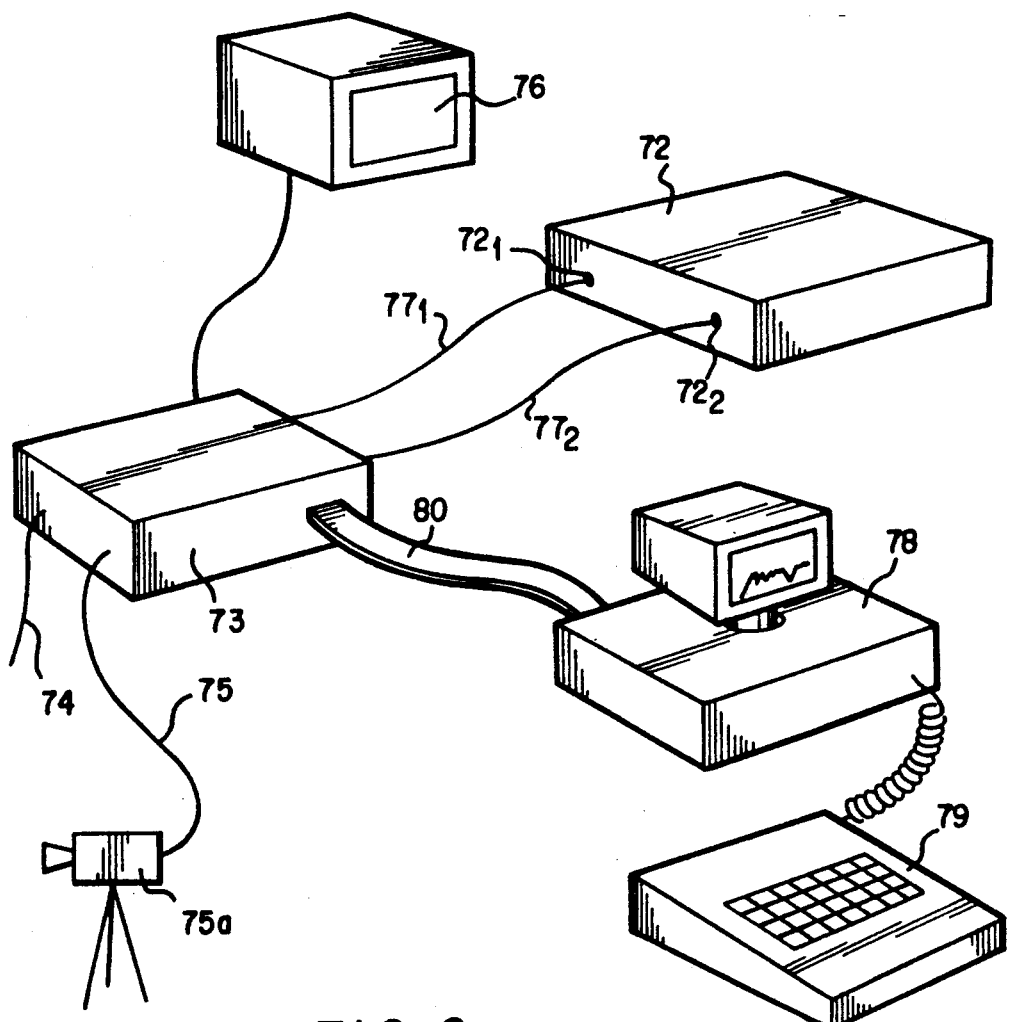
FIG. 6 is a general outlay showing an installation in accordance with the invention designed to record digital information and to process same at some later time.

FIG. 6 shows an overall view in perspective of an installation in accordance with the invention designed to record, on a video recorder, black and white video images and digital information measured during the shooting, and to read said digital information at some later time and process them in a computer.

FIG. 6 shows a commercially-available, PAL system composite video recorder 72, for example a video recorder sold by the SONY Corporation under the brand name "U-MATIC" which utilizes one-hour tapes and which constitutes in the present application a peripheral memory with a storage capacity of 2.5 Gigabytes of digital information. The tapes simultaneously record the synch pulses, the luminance video signals which restitute a black and white picture, and a wave with a frequency of 4.43 MHz which usually corresponds to chrominance signals but is modulated, in the present case, with digital information.

Tape recorder 72 comprises video input $72_1$ and video output $72_2$.

The system comprises case 73 containing printed circuit boards bearing the components and circuits shown in FIGS. 1 and 4.

The digital information originates from a bus which connects a local computer to various measuring instruments. The digital information is generally supplied to case 73 in parallel via one or several lines 74. Reference 75 identifies the video signal output line of black and white or color camera 75a. Reference 76 identifies a video monitor which receives the video signals and displays a black and white picture used to monitor the recording operations and, if needed, to select the sequences to be recorded; said monitor is also used to reproduce the black and white pictures recorded on the video recorder.

Video input $72_1$ of the video recorder is connected via line $77_1$ to the output of case 73 to transmit to the video recorder the signals supplied by mixer 35 shown in FIG. 1.

Video output $72_2$ of the video recorder is connected to input terminal 50 of the circuits shown in FIG. 4.

FIG. 6 shows, in addition, minicomputer 78 equipped with keyboard 79, which is connected via parallel-line cable 80 to output 69 shown in FIG. 4, in such a way that said computer can receive the digital information stored in the peripheral mass storage unit constituted by the video recorder, and subsequently process said recorded information.

FIG. 6 illustrates a possible application of the methods and means in accordance with the invention, which permit the use of a commercially available video recorder to store in real time a large amount of digital information transmitted by numerous sensors and to process said information subsequently.

An embodiment in accordance with FIG. 6 permits recording concurrently digital information and black and white video pictures, and keeping in memory the time relationship between the pictures and the digital values. It also permits reproducing in black and white the memorized pictures at the same time that the digital values are extracted from memory.

The methods and means in accordance with the invention permit using commercially available video recorder 72 as a peripheral mass storage unit used by minicomputer 78.

The means shown in FIGS. 1 and 4 permit recording and conveying concurrently a black and white picture and digital information which replace the chrominance signals.

As a variation, if the digital information data rate is lower, said information can be placed in the form of a phase modulation on certain lines only and keep the chrominance signal on a majority of the lines in order to record and transmit concurrently a color picture and digital values.

What is claimed is:

1. A method for encoding high data rate digital signals in binary form in a composite video signal compatible with one of the PAL- or NTSC-standards, said method comprising the steps of:
    generating a carrier wave having the same frequency as a video chrominance signal carrier wave compatible with said one of the PAL or NTSC standards;
    phase modulating said carrier wave 0° and 180° according to the state of the digital signals to produce a phase modulated carrier wave; and
    mixing said phase modulated carrier wave, a luminance signal carrier wave and video synch pulse and phase reference burst signals compatible with said one of the PAL or NTSC standards to produce an encoded composite video signal.

2. The method of claim 1, comprising the further step of recording said encoded composite video signal on a recorder compatible with said one of the PAL or NTSC standards in accordance with the type of carrier wave and video synch and phase reference burst signals used to produce said encoded composite video signal.

3. The method of claim 1 comprising the further step of transmitting said encoded composite video signal.

4. The method of claim 1 comprising the further steps of:
    generating a PAL-standard compatible composite video signal containing video image information, said PAL-standard compatible video signal comprising a luminance signal carrier wave, a chrominance signal carrier wave, phase reference burst signals and video synch pulse signals; and
    trap filtering said PAL-standard compatible composite video signal to remove said chrominance signal carrier wave; and wherein
    mixing said phase modulated carrier wave with said trap filtered PAL-standard compatible composite video signal constitutes said mixing step; and
    said carrier wave generating step generates a carrier wave with a frequency of 4.43 MHz, thereby producing an encoded PAL-standard compatible encoded composite video signal containing both monochrome video image information and a large volume of separate digital data.

5. The method of claim 4 wherein said mixing step produces an encoded composite video signal in which said digital signals are encoded according to video fields comprising a predetermined number of video display scan lines of signal data, and such that no digital information is conveyed during a predetermined number of scan lines at the beginning and at the end of each video field, thereby avoiding phase interference which would otherwise be caused by the reading heads of a video recorder during recordal of the encoded composite video signal.

6. The method of claim 5 wherein said mixing step includes the step of encoding a binary reference signal at a predetermined interval preceding the first digital signal in each scan line of a video field which contains digital signals.

7. A method for decoding an encoded composite video signal produced by (i) generating a carrier wave with the same frequency as that of the chrominance signal carrier wave of a composite video signal compatible with one of the PAL or NTSC standards comprising different frequency analog luminance and chrominance signals, phase reference burst signals and video synch pulse signals; (ii) phase modulating the carrier wave 0° and 180° with high data rate digital signals in binary form to produce a phase modulated carrier wave; and (iii) mixing the phase modulated carrier wave, the luminance signal and the video synch pulse and the phase reference burst signals of the composite video signal; said method comprising the steps of:
    passband filtering the encoded composite video signal to isolate the phase modulated carrier wave;

generating envelope pulses corresponding to the phase reference burst signals of the encoded composite video signal;

generating responsive to said envelope pulses a phase reference signal in phase with the phase reference burst signals;

demodulating the phase modulated carrier wave in a phase demodulator responsive to said phase reference signal to produce pulses reproducing the encoded digital signals.

8. Apparatus for encoding high data rate digital signals in binary form in a composite video signal compatible with one of the PAL- or NTSC-standards, the digital signals having a high and a low state; said apparatus comprising:

quartz-stabilized oscillator means for generating a carrier wave having the same frequency as a video chrominance signal carrier wave compatible with said one of the PAL or NTSC standards;

phase modulator means responsive to the digital signals for phase modulating said carrier wave 0° when the digital signals assume their high state and 180° when the digital signals assume their low state, and thereby producing a phase modulated carrier wave; and means for mixing said phase modulated carrier wave, a luminance signal carrier wave and video synch pulse and phase reference burst signals compatible with said one of the PAL or NTSC standards to produce an encoded composite video signal.

9. Apparatus according to claim 8 further comprising:

synch pulse regenerator and separator means responsive to the video synch pulse and the phase reference burst signals for producing scan line synch pulses and video field synch pulses; and first means comprising a first pulse counter means having a clock input connected to said line synch pulses and a reset input connected to said field synch pulses for producing address signals; and first memory means responsive to said address signals for outputting a predetermined control signal in response to address signals corresponding to a predetermined number of scan lines at the beginning and end of each video field, said control signal preventing said mixing means from encoding any digital signals in the predetermined number of scan lines at the beginning and at the end of each encoded video field of the encoded composite video signal.

10. The apparatus of claim 9 further comprising:

second means comprising second pulse counter means having a clock input connected to the output of said oscillator means and a reset input connected to said line synch pulses for producing address signals; and second memory means responsive to said second pulse counter means address signals for outputting as a first output coupled to said phase modulator means a binary reference signal having a reference edge for each scan line for use in controlling said phase modulator means, a second output coupled having a period equal to a predetermined multiple of the period of said carrier wave for use in controlling said first and second shift register means.

11. The apparatus of claim 10 further comprising:

third means comprising third pulse counter means having a clock input connected to said third output of said second memory means and a reset input connected to said output of said synch pulse regenerator and separator means for producing address signals, and third memory means coupled to said first and second shift register means and responsive to said third pulse counter address means address signals for producing a first output for generating byte start signals for each scan line, a second output for generating data byte request pulses, and a third output for generating request pulses for control bytes located at the end of each scan line.

12. The apparatus of claim 9 further comprising:

first and second shift register means for alternatively receiving the digital signals from a plurality of parallel input lines and for supplying said digital signals in series to said phase modulator means.

13. Apparatus for decoding an encoded composite video signal produced by (i) generating a carrier wave with the same frequency as that of the chrominance signal carrier wave of a video signal compatible with one of the PAL or NTSC standards comprising different frequency analog luminance and chrominance signals, phase reference burst signals and video synch pulse signals; (ii) phase modulating the carrier wave 0° and 180° with high data rate digital signals in binary form to produce a phase modulated carrier wave; and (iii) mixing the phase modulated carrier wave with the video synch pulse and the phase reference burst signals of the composite video signal to produce the encoded composite video signal; said apparatus comprising:

passband filter means tuned to the frequency of said carrier wave for filtering the encoded composite video signal so as to produce as an output only said phase modulated carrier wave and said video synch pulse and phase reference burst signals;

synch extractor and synch separator means for generating envelope pulses corresponding to the envelopes of said phase reference burst signals;

reference signal regenerating means responsive to the output of said synch extractor and synch separator means and to the output of said passband filter means for generating as a first output a reference wave signal in phase with said phase reference burst signals, and as a second output in synchronism with said first output said phase modulated carrier wave; and phase demodulator means responsive to said reference signal regenerating means first output for demodulating said reference signal regenerating means second output to produce pulses reproducing the encoded digital signals.

14. The apparatus of claim 13 further comprising:

first and second shift register means for alternatively receiving the digital signals output by said phase modulator means and for supplying said digital signals in parallel on plural output lines.

15. Interface apparatus for connecting a composite video recorder compatible with one of the PAL- of NTSC- standard compatible PAL- of NTSC- standards as a digital data mass storage device to a computer, said interface apparatus comprising:

input means for inputting binary signals from said computer having a high and a low state;

quartz-stabilized oscillator means for producing a carrier wave signal having the same frequency as the chrominance signal carrier wave of a composite video signal with which the video recorder is compatible;

phase modulator means, responsive to said binary signals for phase shifting said carrier wave 0° when said binary signals are in a low state and phase shifting said carrier wave 180° when said binary signals are at a high state to produce a phase modulated carrier wave;

video synch generator means for producing video synch pulse signals;

phase reference bursts generator means for producing phase reference burst signals;

mixer means for mixing said video synch pulse signals, said phase reference burst signals and said phase modulated carrier wave to produce a resultant signal;

recorder input means for outputting the resultant signal from said mixer means to a video input of said composite video recorder;

recorder output means for receiving stored resultant signal from a video output of said composite video recorder;

passband filter means, tuned to the frequency of said phase modulated carrier wave, for passing said phase modulated carrier wave and phase reference burst of a received resultant signal as an output;

synch extractor means having an input connected to said recorder output means for supplying envelope pulses of said phase reference burst signals to synch separator means;

reference regenerator means having a first input connected to the output of said passband filter means and a second input connected to said output of said synch separator means for producing a first output which supplies a reference wave in phase with said phase reference burst signals, and a second output which supplies said phase modulated carrier wave;

phase demodulator means including a phase reference input which is connected to said first output of said reference regenerator and a modulated wave input which is connected to said second output of said reference regenerator for producing a pulse output constituting reproduction of said binary signals encoded in the received resultant signals; and output means for outputting said binary signals to said computer.

* * * * *